United States Patent
Amsterdam et al.

(10) Patent No.: US 8,595,761 B2
(45) Date of Patent: Nov. 26, 2013

(54) STREAMING VIDEO WITH ENHANCED OVERLAY POSITIONING

(75) Inventors: Jeffrey David Amsterdam, Roswell, GA (US); Mauro Marzorati, Lutz, FL (US); Brian Marshall O'Connell, Research Triangle Park, NC (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/163,079

(22) Filed: Jun. 17, 2011

(65) Prior Publication Data

US 2012/0324502 A1    Dec. 20, 2012

(51) Int. Cl.
    H04N 7/10      (2006.01)
    H04N 7/025     (2006.01)
    H04N 5/445     (2011.01)
    G06F 3/00      (2006.01)
    G06F 13/00     (2006.01)
    G06F 3/048     (2013.01)

(52) U.S. Cl.
    USPC ............. 725/34; 725/32; 725/37; 715/700; 715/707; 715/765; 715/767; 715/788

(58) Field of Classification Search
    USPC ........................................................ 725/32
    See application file for complete search history.

(56) References Cited

U.S. PATENT DOCUMENTS

| | | | |
|---|---|---|---|
| 6,342,908 B1 * | 1/2002 | Bates et al. ................. | 715/798 |
| 7,823,058 B2 | 10/2010 | Pea et al. | |
| 2002/0196370 A1 | 12/2002 | Dagtas et al. | |
| 2004/0027487 A1 | 2/2004 | Rzadzki et al. | |
| 2006/0123340 A1 * | 6/2006 | Bailey et al. ................. | 715/700 |
| 2006/0268989 A1 | 11/2006 | Kadono et al. | |
| 2009/0031336 A1 * | 1/2009 | Chavez et al. ................. | 725/24 |
| 2009/0214016 A1 * | 8/2009 | O'Sullivan et al. ...... | 379/202.01 |
| 2009/0240516 A1 * | 9/2009 | Palestrant ................. | 705/1 |
| 2009/0249386 A1 * | 10/2009 | Shan et al. ................. | 725/32 |
| 2009/0282358 A1 * | 11/2009 | Park et al. ................. | 715/781 |
| 2010/0162289 A1 * | 6/2010 | Sanders ................. | 725/23 |
| 2010/0164989 A1 | 7/2010 | Margalit et al. | |

OTHER PUBLICATIONS

Gavrilovska, A.-et al.; "Platform Overlays: Enabling In-Network Stream Processing in Large-Scale Distributed Applications"; 15th International Workshop on NOSSDAV05; Jun. 13-14, 2005; ACM, New York, NY, USA.

Rizou, S.-et al.; "Providing QoS Guarantees in Large-Scale Operator Networks"; Proceedings of the 2010 IEEE 12th International Conference on High Performance Computing and Communications; pp. 337-345; Sep. 1-3, 2010; IEEE Computer Society, Los Alamitos, CA, USA.

* cited by examiner

*Primary Examiner* — Justin Shepard
(74) *Attorney, Agent, or Firm* — Alexander Viderman; Mark Vallone; L. Jeffrey Kelly (57) ABSTRACT

Aspects of the present invention place a second object contained within an overlay atop a first object in a first video stream. Suggested positions at which to place the second object atop the first object are received from a plurality of viewers in a first group of viewers of the first video stream. A consensus position at which to place the second object atop the first object is calculated based on the suggested positions. The second object is placed atop the first object at the consensus position. The first and second objects are transmitted to a second group of viewers of the first video stream after a delay period.

20 Claims, 9 Drawing Sheets

STREAMING VIDEO WITH ENHANCED OVERLAY POSITIONING

TECHNICAL FIELD

The disclosure relates generally to streaming video technology, and more specifically, to overlaying objects in streaming videos.

BACKGROUND

In analog television systems, moving video pictures are transmitted as analog signals, continuous in time and amplitude, over a carrier waveform. A moving picture is typically transmitted as a sequential set of "fields", each describing a static image for a receiver device to render on a screen. Each static image for the receiver device to render is substantially "flat". In other words, the static image is merely a collection of pixels without any meaning. A pixel is the smallest unit of an image that can be represented or controlled.

In the analog world, there is no concept of layering objects in video pictures, as the receiver device is not operative to manipulate such objects. The generation of objects to be displayed as an overlay on a video picture is done at the transmitting device, which integrates the objects into the video picture. The receiver device in the analog domain passively displays these objects and does not have technical capability to alter them in any fashion. For example, with analog video broadcast signals, there is a mechanism called closed captioning to transmit a transcription of the audio portion of a program as it occurs, sometimes including non-speech elements. Video receivers enabled to decode and display the contents of closed captions typically allow the viewer to toggle on/off the display of the closed captions. However, the positioning of an object, such as a closed captioning window, on the video picture typically is not under the control of the viewer or the receiver device. Rather, said positioning is encoded at the source. As a result, especially in live broadcasts, the closed captioning window or other objects are often integrated within areas of the video picture that are desirable for viewing, thereby occluding (blocking) the same.

In addition, within the realm of analog video broadcasts exists the concept of Picture-in-Picture (PiP). This feature typically allows displaying one program on the full screen while one or more other programs are displayed in inset windows. PiP requires two independent tuners or signal sources. The receiver device displays the output of one tuner in full screen and the secondary tuner's output as an overlaid picture on top of the primary picture in the full screen. In this case, the receiver device typically enables the viewer to select the position of the PiP window within a set of pre-selected positions on the screen.

In the digital world, video pictures are transmitted as a stream of data within the frame of a CODEC (COder-DECoder). A CODEC is a device or computer program capable of encoding and/or decoding a digital video stream or signal. A CODEC is able to interpret instructions within the video stream and present a displayed object. Some CODECs support the embedding of one secondary video stream within a primary video stream. In this case, the embedding of a secondary video stream, which contains an object to be displayed within a frame of the primary display (video stream), typically contains position information for the object to be displayed. However, the part of the screen that is displaying a primary video stream and is located beneath the object is occluded and thus not visible to the viewer. This degrades the viewer's ability to experience the fullness of the video stream.

SUMMARY

In one aspect, a method for placing a second object contained within an overlay atop a first object in a first video stream is provided. The method comprises a computer receiving suggested positions at which to place the second object atop the first object from a plurality of viewers in a first group of viewers of the first video stream. The method further comprises the computer calculating a consensus position at which to place the second object atop the first object based on the suggested positions. The method further comprises the computer placing the second object atop the first object at the consensus position. The method further comprises the computer, after the step of placing the second object atop the first object at the consensus position and after a delay period, transmitting the first and second objects to a second group of viewers of the first video stream.

In another aspect, a computer program product for placing a second object contained within an overlay atop a first object in a first video stream is provided. The computer program product comprises one or more computer-readable tangible storage devices and program instructions stored on at least one of the one or more computer-readable tangible storage devices. The program instructions comprise program instructions to receive suggested positions at which to place the second object atop the first object from a plurality of viewers in a first group of viewers of the first video stream. The program instructions further comprise program instructions to calculate a consensus position at which to place the second object atop the first object based on the suggested positions. The program instructions further comprise program instructions to place the second object atop the first object at the consensus position. The program instructions further comprise program instructions to transmit the first and second objects to a second group of viewers of the first video stream after a delay period.

In another aspect, a computer system for placing a second object contained within an overlay atop a first object in a first video stream is provided. The computer system comprises one or more processors, one or more computer-readable memories, one or more computer-readable tangible storage devices, and program instructions stored on at least one of the one or more storage devices for execution by at least one of the one or more processors via at least one of the one or more memories. The program instructions comprise program instructions to receive suggested positions at which to place the second object atop the first object from a plurality of viewers in a first group of viewers of the first video stream. The program instructions further comprise program instructions to calculate a consensus position at which to place the second object atop the first object based on the suggested positions. The program instructions further comprise program instructions to place the second object atop the first object at the consensus position. The program instructions further comprise program instructions to transmit the first and second objects to a second group of viewers of the first video stream after a delay period.

DETAILED DESCRIPTION

The invention recognizes that a main drawback of placing a second object contained within an overlay atop a first object in a first video stream is that the portion of a screen that is beneath the second object is occluded and thus not visible to the viewer. If the occluded portion of the screen contains an important part of the action in the first object, the viewer will not see it. This degrades viewer's ability to experience the fullness of the first video stream.

The various embodiments of the present invention provide a method, a computer program product, and a computer system for placing a second object contained within an overlay atop a first object in a first video stream. According to an aspect of the present invention, the position at which to place the second object, such as a PiP window, onto the first object may be automatically determined from feedback data from a group of active viewers of the first video stream. This data may be gathered, for example, using crowd-sourcing techniques, where data collected from individual viewers is compiled into a collection of information. The most desirable position for the second object may be identified from this data according to methods described herein. As used herein, "video overlay" may refer to a technique in which a first object is displayed across the entire screen of a display while a second object is simultaneously displayed in an inset window over the first object. In some instances, the second object may be included in a second video stream, and in these instances, the second object may be a PiP window. The various embodiments of the present invention advantageously prevent the second object from obscuring viewers' primary area of interest in the first object. Furthermore, the various embodiments of the present invention foster a sense of community among viewers because their actions, as a group, may enhance the viewing experience of others.

The term "active viewers group", as used herein, refers to a set of viewers of a first video stream who actively participate in crowd-sourced positioning of second objects contained within overlays atop first objects in the first video stream. In various embodiments, viewers in the active viewers group may also be active participants in crowd-sourced sizing of the second objects. A viewer's continued membership in the active viewers group and ranking within the active viewers group is based on the viewer's continued activity in adjusting the position of the second objects. For example, passive viewership may degrade the viewer's ranking within the active viewers group, and may result in the viewer's demotion to a passive viewers group. On the other hand, the viewer's continual fine-tuning of the position of the second objects may increase the viewer's ranking within the active viewers group and may prevent the viewer from being demoted to the passive viewers group. Additional incentives for active participation in crowd-sourced positioning of the second objects and/or crowd-sourced sizing of the second objects may be implemented, such as, but not limited to, monetary payments that increase with increased participation.

The term "passive viewers group", as used herein, refers to a set of viewers of the first video stream who are not part of the active viewers group. According to an aspect of the present invention, the passive viewers group may include a plurality of passive viewers who choose to not display the second objects, a plurality of automated agents such as recording devices, or a plurality of viewers who less actively adjust the position of the second objects than viewers in the active viewers group.

The term "quantum of time", as used herein, refers to a time period between each change of a position at which to place a second object contained within an overlay atop a first object in a first video stream per a consensus of an active viewers group. In one embodiment, a "quantum of time" parameter may be configured to an optimal value by an administrator of an enhanced overlay positioning program to balance the responsiveness of the enhanced overlay positioning program against requirements for computing resources and activity by viewers in the active viewers group. In another embodiment, the "quantum of time" parameter may be configured to balance the optimal position of the second object against repositioning the second object too frequently.

Figure 1:
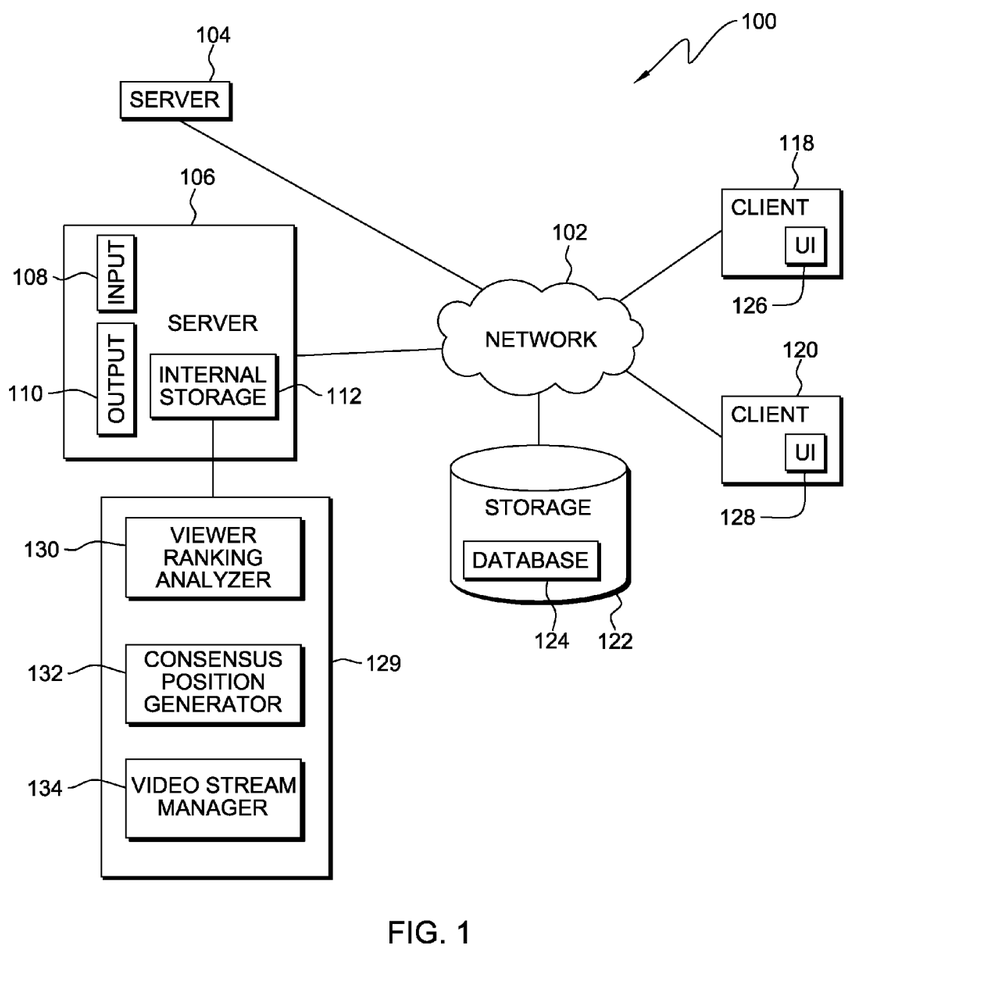
FIG. 1 is an illustration of a data processing environment in accordance with an illustrative embodiment.

FIG. 1 is an illustration of a data processing environment in accordance with an illustrative embodiment. It should be appreciated that FIG. 1 is only provided as an illustration of one implementation and is not intended to imply any limitation with regard to the environments in which different embodiments may be implemented. Many modifications to the depicted environments may be made.

Network data processing system 100 is a network of computers. In the depicted example, network data processing system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as an intranet, a local area network (LAN), or a wide area network (WAN).

Network data processing system 100 contains network 102, which is the medium used to provide communications links between various devices and computers connected together within network data processing system 100. Network 102 may include connections, such as wire, wireless communication links, or fiber optic cables.

Client computers 118 and 120 connect to network 102. Client computers 118 and 120 may be, for example, mobile devices, telephones, television receivers, cell phones, personal digital assistants, netbooks, laptop computers, tablet computers, desktop computers, and/or any type of computing devices capable of transforming a video stream, interpreting instructions within a video stream, and presenting a video stream to a viewer. Client computers 118 and 120 may contain user interfaces (UIs) 126 and 128, respectively, that may process video pictures transmitted in a first video stream, interpret instructions within the first video stream, display second objects contained within overlays atop first objects in the first video stream, and accept commands and data entry from a viewer adjusting a position at which to place the second objects atop the first objects to minimize the occlusion effect. The term "occlusion effect", as used herein, refers to a second object blocking a desirable viewing area of a first object. UIs 126 and 128 can be, for example, graphical user interfaces (GUIs) or web user interfaces (WUIs).

Server computer 104, server computer 106, and storage unit 122 also connect to network 102. Network data processing system 100 may include additional server computers, client computers, displays and other devices not shown. Client computers 118 and 120 are clients to server computer 106 in this example. Also in this example, server computer 106 provides information, such as boot files, operating system images, video streams, and applications to client computers 118 and 120. Server computer 106 may contain an input device 108 and an output device 110.

Enhanced overlay positioning program 129, located in network data processing system 100, may comprise program instructions stored on one or more computer-readable tangible storage devices, which may include internal storage 112 on server computer 106. Enhanced overlay positioning program 129 may be downloaded to a data processing system or other device for use. Enhanced overlay positioning program 129 may communicate via local and/or remote processes, such as in accordance with a signal having one or more data packets (for example, but not limited to, data from one program interacting with another program in a local system, distributed system, and/or across network 102 with other systems via the signal). Data gathered, generated, and maintained for use by enhanced overlay positioning program 129 may be kept in internal storage 112 of server computer 106 or in one or more databases 124 of storage unit 122.

Enhanced overlay positioning program 129 may include various programs or program components, such as viewer ranking analyzer 130, consensus position generator 132, and video stream manager 134. Viewer ranking analyzer 130 may be, for example, a computer program or program component for analyzing the ranking of an active viewer within an active viewers group and for calculating that viewer's actual delay as discussed in conjunction with FIGS. 3 and 7. Consensus position generator 132 may be, for example, a computer program or program component for computing the position at which to place a second object contained within an overlay atop a first object in a first video stream and a size of the second object based on input from an active viewers group. Viewer ranking analyzer 130 and consensus position generator 132 reside within enhanced overlay positioning application program 129 and may be localized on server 106 and/or distributed between two or more servers. Video stream manager 134 may be, for example, a computer program or program component capable of obtaining active viewers' adjustments to a position at which to place a second object contained within an overlay atop a first object in a first video stream, processing pictures and instructions within a video stream, and displaying a video stream on viewers' devices. Video stream manager 134 may be downloaded to client computer 118 over network 102 for use on client computer 118, and may include UI 126. Client computer 118 may receive, process, display and/or otherwise render audio, video and image data contained within a video stream.

Figure 2:
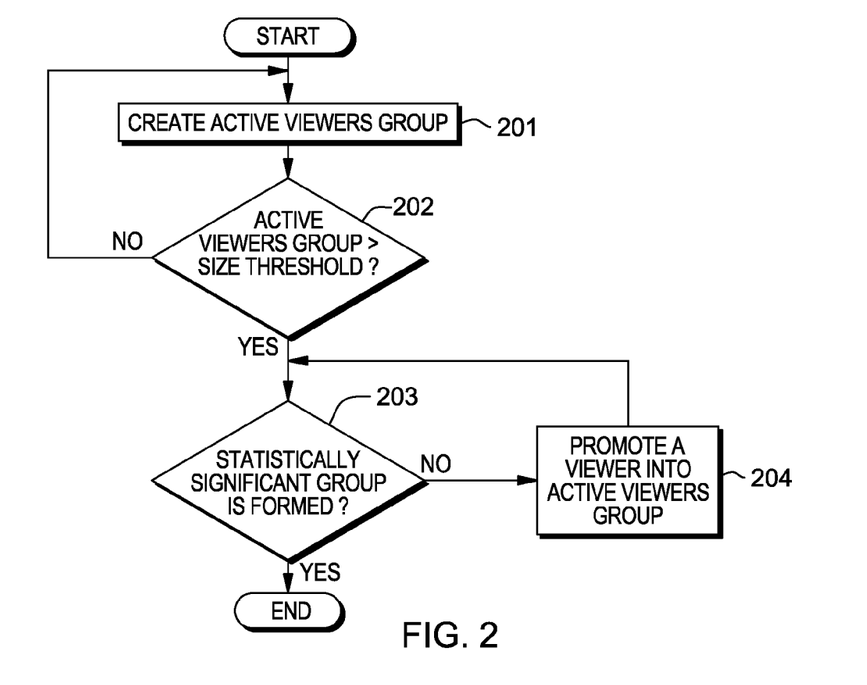
FIG. 2 is a flowchart of a method for forming an active viewers group according to an illustrative embodiment.

Turning now to FIG. 2, FIG. 2 is a flowchart of a method for forming an active viewers group according to an illustrative embodiment. At step 201, viewer ranking analyzer 130 creates an active viewers group. Viewer ranking analyzer 130 may initially create the active viewers group by conferring active viewer status to all viewers of a first video stream. It should be noted that the initial set of active viewers may comprise human users as well as automated agents, for example, but not limited to, streaming recording programs or devices. Viewer ranking analyzer 130 initially confers all viewers with active viewer status because initially, no viewer has a history of adjusting a position at which to place a second object contained within an overlay atop a first object in the first video stream. It may not be desirable to track viewers' object placements until the size of the active viewers group reaches a size threshold, such as 100 viewers. In an embodiment, this threshold may be a parameter configurable by an administrator of viewer ranking analyzer 130 or enhanced overlay positioning program 129. Viewer ranking analyzer 130 may continue to create the active viewers group by adding viewers to the active viewers group until viewer ranking analyzer 130 determines that the size of the active viewers group has at least reached the size threshold (step 202).

In response to viewer ranking analyzer 130 creating the active viewers group with a minimum desirable number of viewers, at step 203, viewer ranking analyzer 130 determines whether the active viewers group includes a statistically significant number of viewers as compared to the universe of viewers of the first video stream. In an embodiment, the administrator may arbitrarily set the statistically significant number as a measure of desired optimum minimalization of the occlusion effect. It will be apparent to one skilled in the art that the higher the statistically significant number, the higher the chance that the average position selected by the viewers in the active viewers group optimally minimizes the occlusion effect. In other words, if the statistically significant number of members is set to 5% of the universe of viewers of the first video stream, the occlusion effect may be more minimal than if the statistically significant number is set to only 0.1% of the of the universe of viewers. Setting a high level of statistical significance has some drawbacks, as it would increase computing requirements. At a constant level of significance, if the universe of viewers increases, so does the size of the active viewers group.

If at step 203, viewer ranking analyzer 130 determines that the active viewers group does not include the statistically significant number of viewers, viewer ranking analyzer 130 will promote a viewer from the passive viewers group into the active viewers group (step 204). Promotion of a viewer into the active viewers group may be implemented by a variety of techniques known to those skilled in the art. For example, viewer ranking analyzer 130 may utilize a random selection algorithm to select one or more viewers from the passive viewers group of the first video stream.

Figure 3:
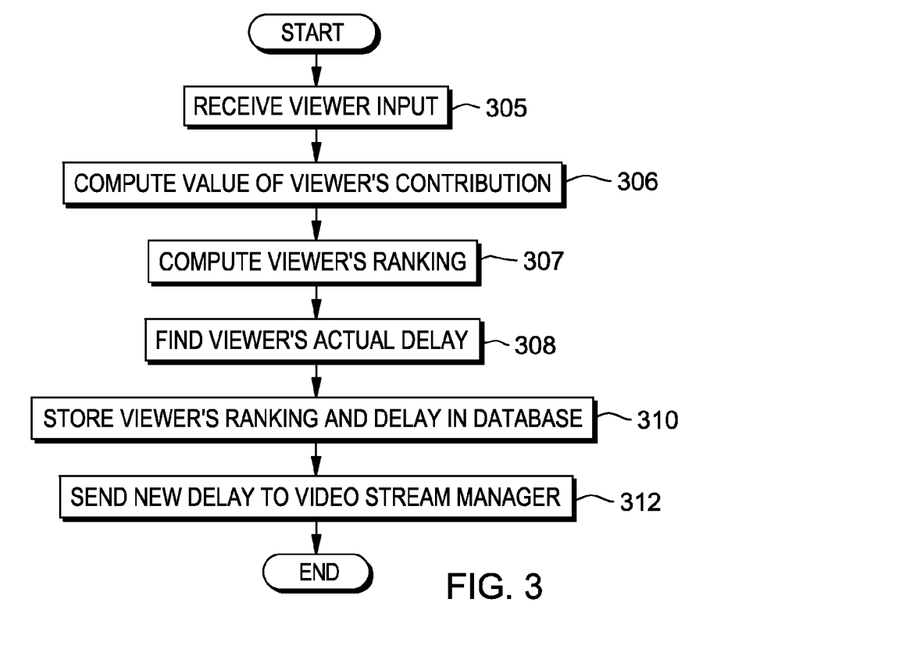
FIG. 3 is a flowchart of a method for processing input from a viewer according to an illustrative embodiment.

FIG. 3 is a flowchart of a method for processing input from a viewer according to an illustrative embodiment. At step 305, viewer ranking analyzer 130 receives a viewer's input from video stream manager 134. In an embodiment, the input may comprise suggested coordinates at which to place a second object contained within an overlay atop a first object in a first video stream. At step 306, discussed further below in conjunction with FIG. 5, viewer ranking analyzer 130 computes the value of the viewer's contribution based on the suggested coordinates to the actual coordinates at which the second object is placed atop the first object. At step 307, discussed further below in conjunction with FIG. 6, viewer ranking analyzer 130 computes the value of the viewer's ranking within the active viewers group based on the value of the viewer's contribution. At step 308, discussed further below in conjunction with FIG. 7, viewer ranking analyzer 130 calculates an actual delay in presenting the first video stream to the viewer. At step 310, viewer ranking analyzer 130 stores the suggested coordinates, the value of the viewer's contribution, and the value of the viewer's ranking, for example, in database 124. At step 312, viewer ranking analyzer 130 transmits the actual delay value, calculated at step 308, to video stream manager 134.

Figure 4:
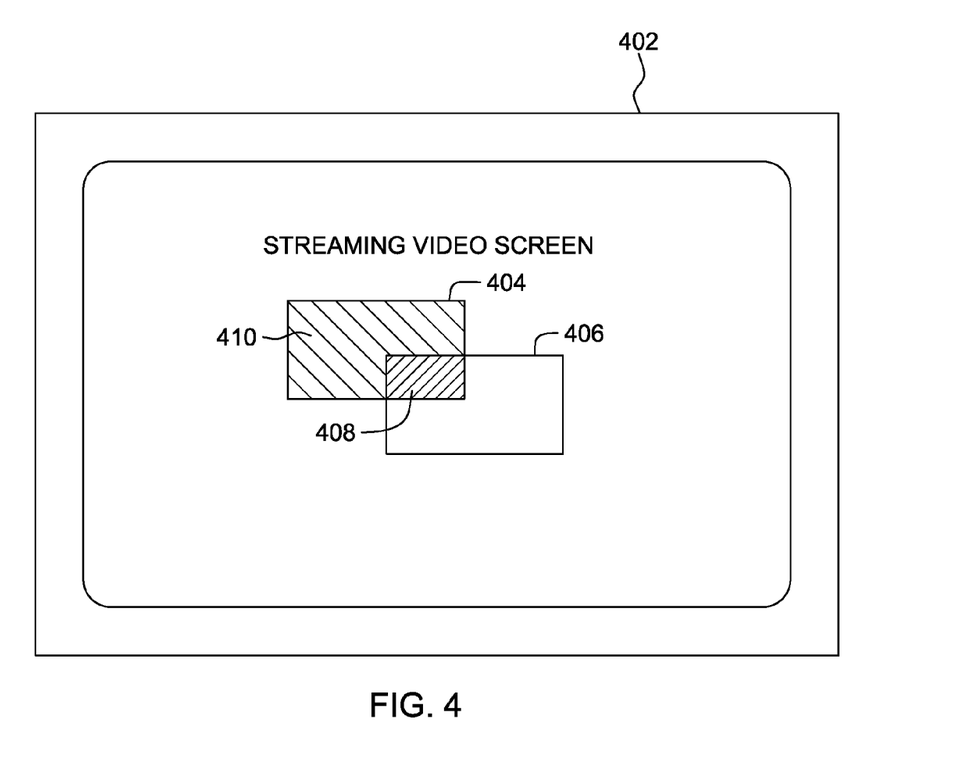
FIG. 4 is a pictorial representation showing a viewer's suggested position at which to place a second object contained within an overlay atop a first object in a first video stream in relation to a position at which to place the second object atop the first object per a consensus of an active viewers group in accordance with an illustrative embodiment.

FIG. 4 is a pictorial representation showing a viewer's suggested position at which to place a second object contained within an overlay atop a first object in a first video stream in relation to a position at which to place the second object atop the first object per a consensus of an active viewers group in accordance with an illustrative embodiment. FIG. 4 depicts an integrated display 402, an active viewer's suggested position 404 at which to place the second object, and a consensus position 406 at which to place the second object per a consensus of the active viewers group. Consensus position generator 132 may calculate the consensus position as discussed further below in conjunction with FIG. 8. A number of pixels 408 are shared by the second object placed at active viewer's suggested position 404 and the second object placed at consensus position 406. A number of pixels 410 in the second object placed at active viewer's suggested position 404 are not shared with the second object placed at consensus position 406.

Figure 5:
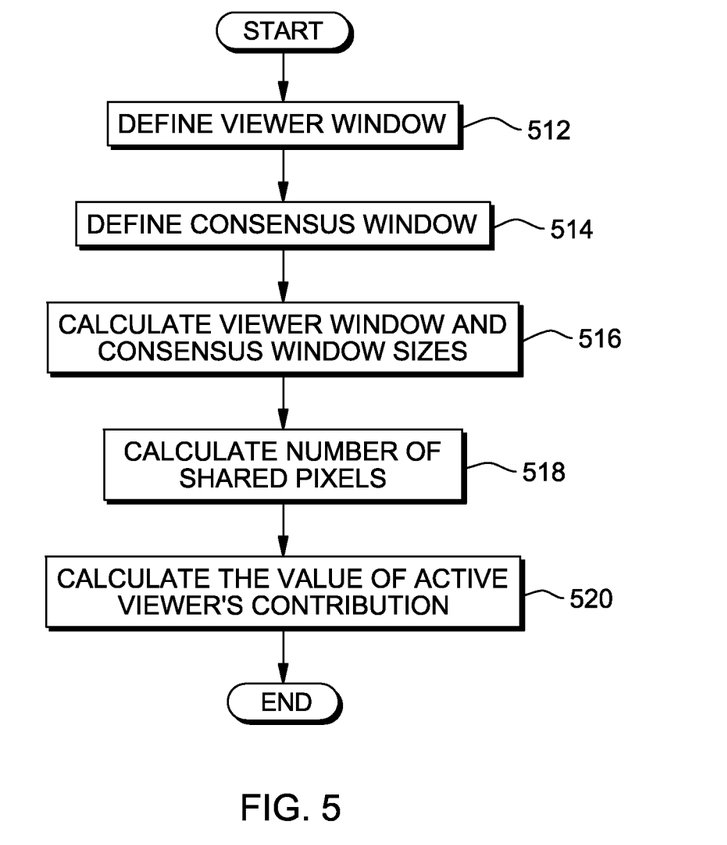
FIG. 5 is a flowchart of a method for calculating the value of a contribution of an active viewer to a consensus position at which a second object contained within an overlay atop a first object in a first video stream in accordance with an illustrative embodiment.

FIG. 5 is a flowchart of a method for calculating the value of a contribution of an active viewer to a consensus position at which a second object contained within an overlay atop a first object in a first video stream in accordance with an illustrative embodiment. The method may be expressed, for example, by the following pseudo-code:

```
ViewerWindow:= [(Ux₁, Uy₁), (Ux₂, Uy₂)];
ViewerPx:= (Ux₂– Ux₁)* (Uy₂– Uy₁);
ConsensusWindow:= [(Cx₁, Cy₁), (Cx₂, Cy₂)];
ConsensusPx:= (Cx₂– Cx₁)* (Cy₂– Cy₁);
PresentPx:=0;
Loop x from Cx₁ until Cx₂
    Loop y from Cy₁ until Cy₂
        If (Ux₁ <= x <= Ux₂) and (Uy₁ <= y <= Uy₂) then
            PresentPx++;
If (ViewerPx > ConsensusPx) then
    Value:=PresentPx / ViewerPx;
Else
    Value:=PresentPx / ConsensusPx;
```

Viewer ranking analyzer 130 defines the ViewerWindow parameter (step 512) as the Cartesian coordinates for the top left corner ($Ux_1$ and $Uy_1$) and the bottom right corner ($Ux_2$ and $Uy_2$) of the second object at the active viewer's suggested position 404 of FIG. 4. Similarly, viewer ranking analyzer 130 defines the ConsensusWindow parameter (step 514) as the Cartesian coordinates for the top left corner ($Cx_1$ and $Cy_1$) and the bottom right corner ($Cx_2$ and $Cy_2$) of the second object at the viewers' consensus position 406 of FIG. 4. It should be noted that Cartesian coordinate values, as used herein, are defined with respect to a coordinate system having an origin at the upper left corner of the displayed first video stream. Viewer ranking analyzer 130 uses parameters ViewerPx and ConsensusPx to calculate the size of the ViewerWindow and ConsensusWindow, respectively (step 516). Viewer ranking analyzer 130 initializes pixel counter PresentPx to 0. Viewer ranking analyzer 130 counts number of pixels 408 of FIG. 4 (step 518) by utilizing the loop presented in the above pseudo-code.

Viewer ranking analyzer 130 calculates the value of the contribution of an active viewer (step 520). In one embodiment, viewer ranking analyzer 130 may compute the value of the contribution of the active viewer to consensus position 406 by computing a percentage or ratio between number of pixels 408 (PresentPx) to either a number of pixels in the ConsensusWindow (if the ViewerWindow is of the same or a smaller size than the ConsensusWindow) or a number of pixels in the ViewerWindow (if the ViewerWindow is larger in size than the ConsensusWindow). For example, if there is a ConsensusWindow of 100 pixels that are all shared with the ViewerWindow (meaning that number of pixels 408 is 100), but the size of the ViewerWindow is 400 pixels, then the calculated value of the contribution (denoted as "Value" in the above pseudo code) is equal to 25% because, when the ViewerWindow is larger in size than the ConsensusWindow, viewer ranking analyzer 130 divides number of pixels 408 by the size of the ViewerWindow. Conversely, if there is a ConsensusWindow of 100 pixels, but the ViewerWindow is 25 pixels (all of them shared with the ConsensusWindow, meaning that number of pixels 408 is 25), the calculated value ("Value") is still equal to 25%, because in the case where the ViewerWindow is of the same or a smaller size than the ConsensusWindow, viewer ranking analyzer 130 divides number of pixels 408 by the size of the ConsensusWindow. The method described in this paragraph prevents the active viewer from gaming the system to increase the value of his or her contribution to consensus position 406 (and thereby increase the ranking of the active viewer within the active viewers group) by oversizing the second object at position 404. In fact, the method penalizes the active viewer for doing so by reducing the resulting absolute value of his or her contribution. In some embodiments, viewer ranking analyzer 130 may multiply the value of the active viewer's contribution by a factor greater than 0. This factor may be a configurable parameter, which would allow the administrator to control the time it takes a viewer to rise in ranking.

Figure 6:
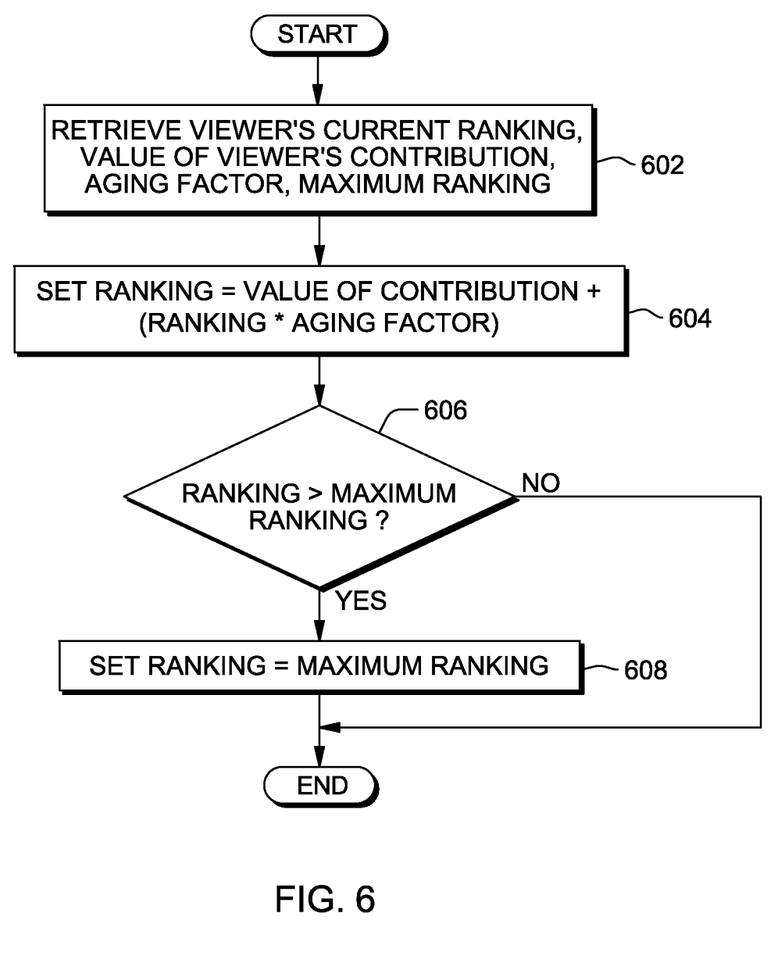
FIG. 6 is a flowchart of a method for calculating the ranking of an active viewer in accordance with an illustrative embodiment.

FIG. 6 is a flowchart of a method for calculating the ranking of an active viewer in accordance with an illustrative embodiment. Viewer ranking analyzer 130 may employ the method to implement step 307 shown in FIG. 3. At step 602, viewer ranking analyzer 130 may retrieve a value of an active viewer's current rank within the active viewers group and the value of the viewer's contribution, as well as MaximumRanking and AgingFactor parameters from storage, e.g., database 124. Viewer ranking analyzer 130 may compute the value of the active viewer's contribution as discussed above in conjunction with FIG. 5. The MaximumRanking parameter may represent a ranking threshold that prevents the most active viewers from becoming too influential on consensus position calculations. An administrator may set the MaximumRanking parameter to a predetermined value. Furthermore, an administrator may arbitrarily set the AgingFactor parameter, which will control how much effect active viewer's past contribution will have on his or her current rank. The lower the value of AgingFactor, the faster a viewer's past contributions are antiquated. At step 604, viewer ranking analyzer 130 calculates a new value of the active viewer's rank by adding the value of the active viewer contributions to the product of the value of the active viewer's current rank and AgingFactor. At step 606, viewer ranking analyzer 130 compares the new value of the active viewer's rank to MaximumRanking. If the new value of the active viewer's rank computed at step 604 is higher than the MaximumRanking value, the new value of the active user's rank is reduced to MaximumRanking (step 608), indicating that the active viewer is a top contributor within the active viewers group.

Figure 7:
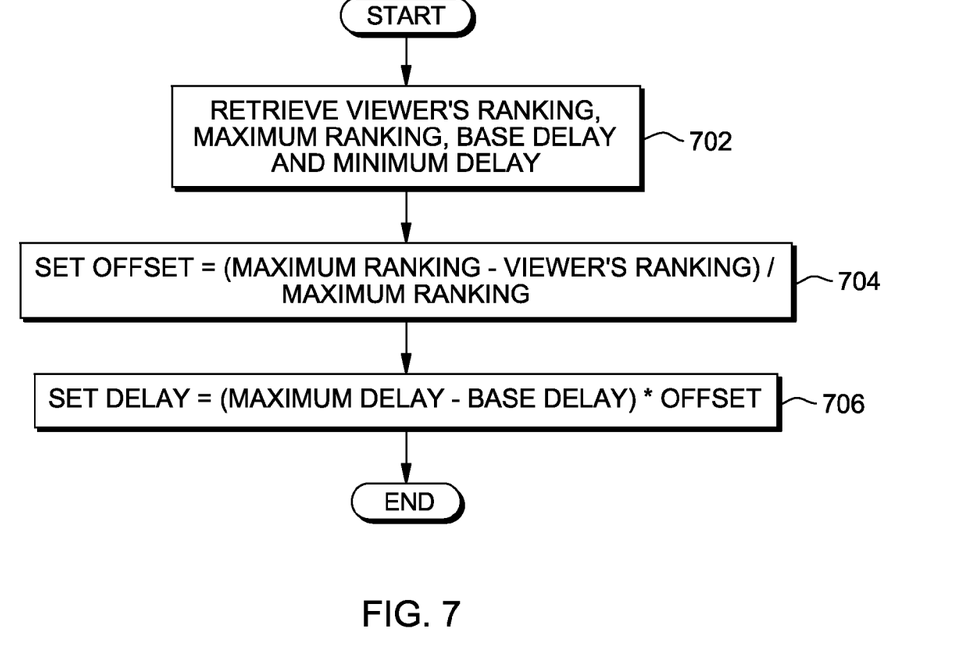
FIG. 7 is a flowchart of a method for calculating an actual delay in sending a first video stream to an active viewer in accordance with an illustrative embodiment.

FIG. 7 is a flowchart of a method for calculating an actual delay in sending a first video stream to an active viewer in accordance with an illustrative embodiment. Viewer ranking analyzer 130 may employ the method to implement step 308 shown in FIG. 3. At step 702, viewer ranking analyzer 130 may retrieve a value of an active viewer's rank within an active viewers group, as well as MaximumRanking, BaseDelay and MaximumDelay parameters, from storage, e.g., database 124. BaseDelay is a value chosen by the administrator of the first video stream that applies to all viewers of the first video stream and is a delay that is sufficient to allow the system to determine a consensus position at which to place a second object contained within an overlay atop a first object in the first video stream and to place the second object atop the first object at the consensus position. In some embodiments, the first video stream may comprise a live broadcast program. It should be noted that a regulating authority, such as the Federal Communications Commission (FCC) in the United States, may mandate a delay in broadcasting a live program. Therefore, the administrator should choose a BaseDelay value for the first video stream that conforms to local regulations. MaximumDelay is a predetermined value that the administrator may choose and that represents the delay value assigned to a passive viewers group. It should be noted that MaximumDelay value includes BaseDelay.

In various embodiments, the delay in presenting the first video stream to viewers in the active viewers group increases as viewer rank decreases. As a result, the actual delay experienced by the active viewer may be calculated as the sum of BaseDelay and an offset delay. At step 704, viewer ranking analyzer 130 calculates the active viewer's offset delay as the difference between MaximumRanking and the ranking of the active viewer within the active viewers group divided by MaximumRanking.

At step 706, viewer ranking analyzer 130 calculates the actual delay for the active viewer by multiplying the offset value by the difference between MaximumDelay and BaseDelay. This method allows the active viewer with the highest ranking (top contributor) to have an offset of zero, effectively having a delay that matches BaseDelay. Viewers with no ranking (e.g., viewers in the passive viewers group) will have the maximum possible delay equal to the MaximumDelay set by the administrator. Viewers in the active viewers group will therefore have an actual delay value somewhere between BaseDelay and MaximumDelay, inclusive.

Figure 8:
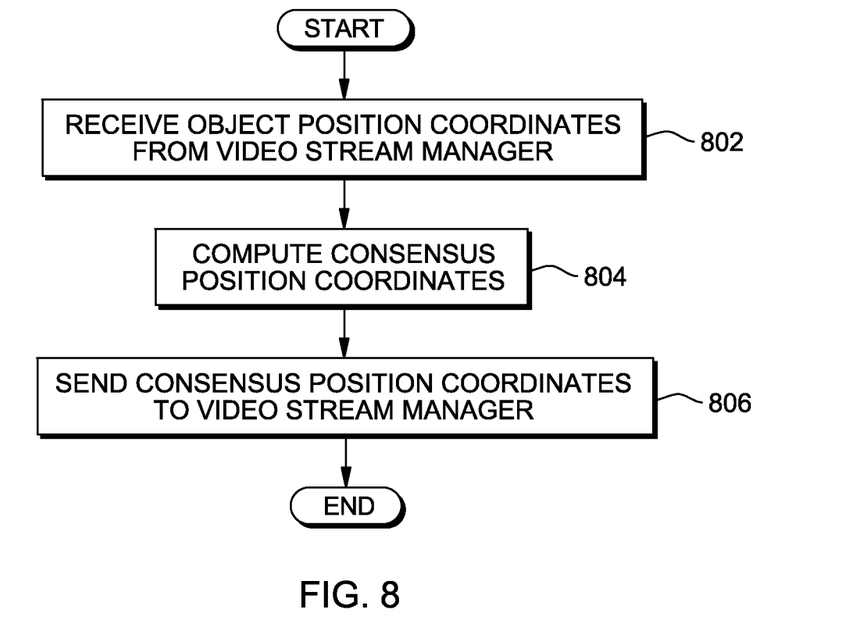
FIG. 8 is flowchart of a method for determining a set of coordinates on a frame of a video stream at which to overlay an object per a consensus of viewers in an active viewers group and for a quantum of time.

FIG. 8 is a flowchart of a method for determining a set of coordinates on a frame of a video stream at which to overlay an object per a consensus of viewers in an active viewers group and for a quantum of time. Typically, the active viewer with the highest ranking within the active viewers group will tend be the one best representing the consensus of the active viewers' group as to positions at which to place objects to minimize the occlusion effect. At step 802, consensus position generator 132 may receive from video stream manager 134 positions suggested by all active viewers within an active viewers group at which to place an object for the quantum of time. In one embodiment, the suggested positions can be suggested coordinates within a frame of the video stream. At step 804, based on the input obtained at step 802, consensus position generator 132 computes coordinates that represent a consensus of the coordinates suggested by the active viewers. In one embodiment, consensus position generator 132 can compute the consensus coordinates by calculating a weighted average of the coordinates suggested by the active viewers. More specifically, consensus position generator 132 can calculate a weighted average of Cartesian coordinates of the top-left corner and the bottom-right corner of the object at the positions suggested by the active viewers. The Cartesian consensus coordinates of the top-left corner may be calculated with the formula:

$$\left(\frac{\sum x_{1i} S_i}{\sum S_i}, \frac{\sum y_{1i} S_i}{\sum S_i}\right)$$

Similarly, the Cartesian consensus coordinates of the bottom-right corner may be calculated with the formula:

$$\left(\frac{\sum x_{2i} S_i}{\sum S_i}, \frac{\sum y_{si} S_i}{\sum S_i}\right)$$

In the formulas above, $(x_{1i}, y_{1i})$ and $(x_{2i}, y_{2i})$ are Cartesian coordinates for the top-left and bottom right corners of the object at a position suggested by viewer i, and $S_i$ represents the ranking of viewer i, as calculated by viewer ranking analyzer 130 at step 307 of FIG. 3. According to the formulas above, Cartesian consensus coordinates are calculated as the average coordinates suggested by the active viewers weighted by their corresponding ranking within the active viewers group. In this manner, the active viewer with the highest ranking has the most effect in the resulting Cartesian consensus coordinates and object size. At step 806, consensus position generator 132 sends consensus coordinates back to video stream manager 134. In some embodiments, consensus position generator 132 may also store these coordinates, e.g., in database 124.

Figure 9:
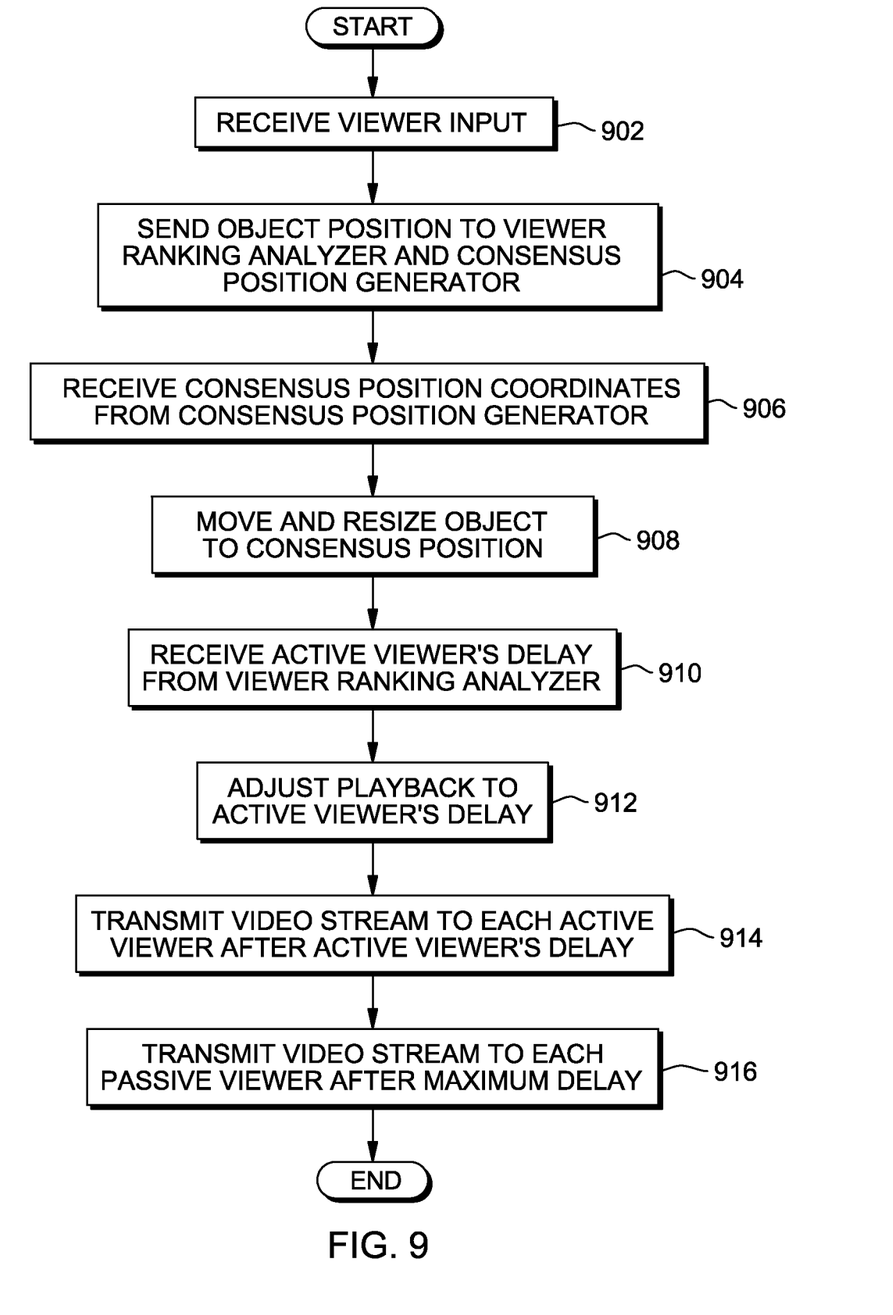
FIG. 9 is a flowchart of a method performed by a video stream manager in accordance with an illustrative embodiment.

FIG. 9 is a flowchart of a method performed by a video stream manager in accordance with an illustrative embodiment. Video stream manager 134 may interact with active viewers, process pictures and instructions within a video stream, and display primary and secondary video streams on viewers' devices. In various embodiments, video stream manager program 134 may be implemented as a web-browser application layer plugin, such as Adobe® Flash®, Microsoft® Silverlight®, Oracle® Java®, or in any HTML5 compliant code. At step 902, video stream manager 134 may receive active viewers' input. The input may be suggested positions at which to place a second object contained within an overlay atop a first object in a first video stream. An active user can suggest a position by moving and/or resizing the second object displayed on their devices. The active viewers may move or resize the second object by utilizing a mouse or any other pointing device that is capable of indicating a position and/or motion to the device. At step 904, video stream manager 134 may send suggested positions to viewer ranking analyzer 130 and consensus position generator 132 for each active viewer. At step 906, video stream manager 134 may receive a position at which to place the second object per a consensus of an active viewers group from consensus position generator 132. At step 908, video stream manager 134 moves and/or resizes the second object within a frame of the first video stream to the consensus position. In this manner, video stream manager 134 will place the object based on the position provided by consensus position generator 132 for all passive viewers before transmitting the first video stream in order to avoid the occlusion effect.

At least one embodiment of the present invention contemplates that the consensus position coordinate information will be embedded as metadata in the first video stream. The embedding of the metadata may be done in a variety of ways. In some embodiments, the first video stream may be expressed in accordance with Microsoft® Advanced Streaming Format (ASF), a file format designed to store synchronized multimedia data. This format allows the second object, which can be, for example, but not limited to a JPEG image, to be embedded at specific locations in a video stream. Viewing devices designed to interpret and play ASF files will recognize these embedded objects and act upon them. In this case, an ASF file may be injected with a JPEG by interleaving data packets containing these images within the ASF File Data Object. For example, if the first video stream is encoded using the ASF file format and the second object is an image, video stream manager 134 may generate a script command, e.g., "image:location={50,50, 100,100}, image.bmp". Video stream manager 134 may interleave this script command and the image.bmp file corresponding to the second object into the video data packet stream of the first video stream. Video stream manager 134 then transmits the first video stream to a viewing device. The viewing device, while displaying the frames of the first video stream can access the embedded metadata and use it to supplement the frames of the video image by displaying the second object at the consensus position, as defined by the embedded metadata. In the example above, when the viewing device encounters the script command in the first video data packet stream, it begins receiving the image.bmp file. Once the image.bmp file is fully received, the viewing device displays the second object at the consensus coordinates indicated by the "location" parameter in the script command.

At step 910, video stream manager 134 receives a calculated viewer's delay for each active viewer from viewer ranking analyzer 130. As previously indicated, each viewer's delay value is dependent on that viewer's inclusion and ranking within the active viewers group. At step 912, video stream manager 134 adjusts the first video stream to incorporate such delay into subsequent playback for each active viewer. At step 914, video stream manager 134 transmits the first video stream to each active viewer after the delay for such active viewer. At step 916, video stream manager 134 transmits the first video stream to each passive viewer in the passive viewers group after the Maximum Delay.

Figure 10:
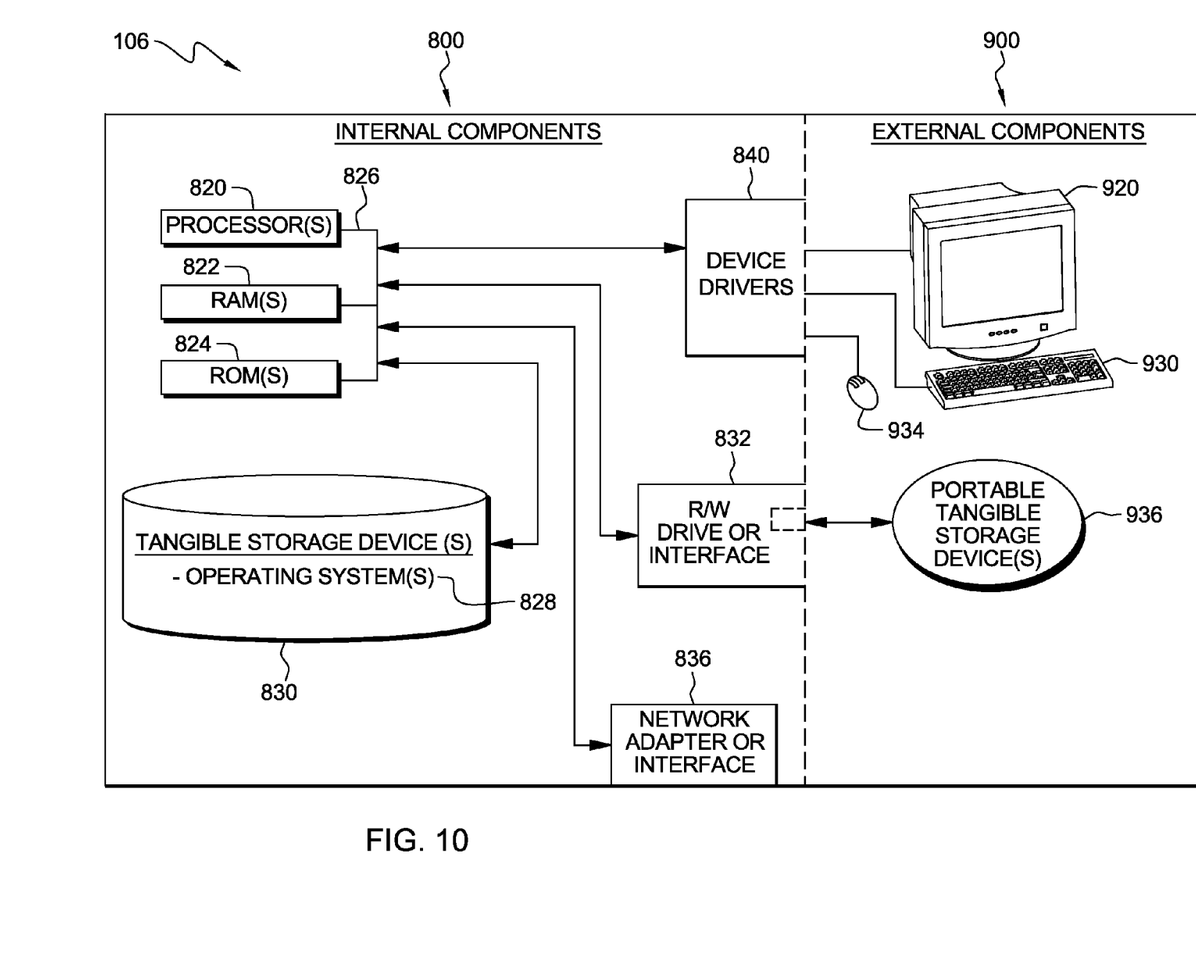
FIG. 10 illustrates internal and external components of a server computer in accordance with an illustrative embodiment.

FIG. 10 illustrates internal and external components of server computer 106 in accordance with an illustrative embodiment. Server computer 106 includes internal components 800 and external components 900. Internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828, enhanced overlay positioning program 129, viewer ranking analyzer 130, consensus position generator 132, and video stream manager 134 are stored on one or more of the computer-readable tangible storage devices 830 for execution by one or more of the processors 820 via one or more of the RAMs 822 (which typically include cache memory). In the embodiment illustrated in FIG. 10, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information. The term "computer-readable tangible storage device" does not encompass a signal propagation medium such as a copper cable, optical fiber, or wireless transmission medium.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. Viewer ranking analyzer 130, consensus position generator 132, and video stream manager 134 can be stored on one or more of the portable computer-readable tangible storage devices 936, read via R/W drive or interface 832 and loaded into one or more computer-readable tangible storage devices 830.

Internal components 800 also include a network adapter or interface 836 such as a TCP/IP adapter card. Enhanced overlay positioning program 129, viewer ranking analyzer 130, consensus position generator 132, and.or video stream manager 134 can be downloaded to computer sever 106 from an external computer via a network (for example, the Internet, a local area network or other, wide area network) and network adapter or interface 836. From the network adapter or interface 836, Enhanced overlay positioning program 129, viewer ranking analyzer 130, consensus position generator 132, and/or video stream manager 134 are loaded into one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Enhanced overlay positioning program 129, viewer ranking analyzer 130, consensus position generator 132, and video stream manager 134 can be written in various programming languages including low-level, high-level, object-oriented or non object-oriented languages. Alternatively, the functions of enhanced overlay positioning program 129, viewer ranking analyzer 130, consensus position generator 132, and video stream manager 134 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for placing a second object contained within an overlay atop a first object in a first video stream, the method comprising the steps of:

dynamically assigning a plurality of viewers of the first video stream to a first group of viewers based on a predetermined activity criterion;

promoting one or more viewers from a second group of viewers to the first group of viewers, in response to determining that a number of the assigned viewers in the first group of viewers is substantially below a statistically significant number of viewers, the second group of viewers comprising viewers having a lower activity level as compared to the first group of viewers;

receiving suggested positions at which to place the second object atop the first object from the first group of viewers;

calculating, by one or more processors, a consensus position at which to place the second object atop the first object based on the suggested positions;

placing the second object atop the first object at the consensus position; and after the step of placing the second object atop the first object at the consensus position and after a delay period, transmitting the first and second objects to the second group of viewers of the first video stream.

2. The method of claim 1, further comprising the step of: ranking a first viewer within the first group of viewers.

3. The method of claim 2, further comprising before the step of ranking, determining, by one or more processors, a value corresponding to the first viewer's contribution to the consensus position.

4. The method of claim 2, further comprising after the step of ranking, transmitting the first and second objects to the first viewer prior to transmitting the first and second objects to a second viewer in the first group of viewers.

5. The method of claim 1, wherein the suggested positions comprise coordinates identified by the plurality of viewers in the first group of viewers at which to place the second object atop the first object.

6. The method of claim 5, wherein the step of calculating the consensus position further comprises calculating a weighted average of the coordinates.

7. The method of claim 1, wherein the second object comprises a second video stream.

8. A computer program product for placing a second object contained within an overlay atop a first object in a first video stream, the computer program product comprising one or more computer-readable tangible storage devices and program instructions stored on at least one of the one or more computer-readable tangible storage devices, the program instructions comprising:

program instructions to dynamically assign a plurality of viewers of the first video stream to a first group of viewers based on a predetermined activity criterion;

program instructions to promote one or more viewers from a second group of viewers to the first group of viewers, in response to determining that a number of the assigned viewers in the first group of viewers is substantially below a statistically significant number of viewers, the second group of viewers comprising viewers having a lower activity level as compared to the first group of viewers;

program instructions to receive suggested positions at which to place the second object atop the first object from the first group of viewers;

program instructions to calculate a consensus position at which to place the second object atop the first object based on the suggested positions;

program instructions to place the second object atop the first object at the consensus position; and program instructions to transmit the first and second objects to the second group of viewers of the first video stream after a delay period.

9. The computer program product of claim 8, further comprising program instructions, stored on at least one of the one or more computer-readable tangible storage devices, to rank a first viewer within the first group of viewers.

10. The computer program product of claim 9, further comprising program instructions, stored on at least one of the one or more computer-readable tangible storage devices, to determine a value of a contribution of the first viewer to the consensus position.

11. The computer program product of claim 9, further comprising program instructions, stored on at least one of the one or more computer-readable tangible storage devices, to transmit the first and second objects to the first viewer prior to transmitting the first and second objects to a second viewer in the first group of viewers.

12. The computer program product of claim 8, wherein the suggested positions comprise coordinates identified by the plurality of viewers in the first group of viewers at which to place the second object atop the first object.

13. The computer program product of claim 12, wherein the program instructions to calculate the consensus position further comprise program instructions to calculate a weighted average of the coordinates.

14. The computer program product of claim 8, wherein the second object comprises a second video stream.

15. A computer system for placing a second object contained within an overlay atop a first object in a first video stream, the computer system comprising one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to dynamically assign a plurality of viewers of the first video stream to a first group of viewers based on a predetermined activity criterion;

program instructions to promote one or more viewers from a second group of viewers to the first group of viewers, in response to determining that a number of the assigned viewers in the first group of viewers is substantially below a statistically significant number of viewers, the second group of viewers comprising viewers having a lower activity level as compared to the first group of viewers;

program instructions to receive suggested positions at which to place the second object atop the first object from the first group of viewers;

program instructions to calculate a consensus position at which to place the second object atop the first object based on the suggested positions;

program instructions to place the second object atop the first object at the consensus position; and program instructions to transmit the first and second objects to the second group of viewers of the first video stream after a delay period.

16. The computer system of claim 15, further comprising program instructions, stored on at least one of the one or more storage devices for execution by at least one of the one or more processors via at least one of the one or more memories, to rank a first viewer within the first group of viewers.

17. The computer system of claim 16, further comprising program instructions, stored on at least one of the one or more storage devices for execution by at least one of the one or more processors via at least one of the one or more memories, to determine a value of a contribution of the first viewer to the consensus position.

18. The computer system of claim 16, further comprising program instructions, stored on at least one of the one or more storage devices for execution by at least one of the one or more processors via at least one of the one or more memories, to transmit the first and second objects to the first viewer prior to transmitting the first and second objects to a second viewer in the first group of viewers.

19. The computer system of claim 15, wherein the suggested positions comprise coordinates identified by the plurality of viewers in the first group of viewers at which to place the second object atop the first object.

20. The computer system of claim 19, wherein the second object comprises a second video stream.

* * * * *